(12) United States Patent
Chen

(10) Patent No.: US 6,578,845 B2
(45) Date of Patent: Jun. 17, 2003

(54) AUTOMATIC DOCUMENT FEEDING APPARATUS HAVING SEPARATION MECHANISM

(75) Inventor: Sun Chen, Hsin-Chu (TW)

(73) Assignee: Mustek Systems Inc. (TW)

( * ) Notice: Subject to any disclaimer, the term of this patent is extended or adjusted under 35 U.S.C. 154(b) by 86 days.

(21) Appl. No.: 09/828,186

(22) Filed: Apr. 9, 2001

(65) Prior Publication Data
US 2002/0145250 A1 Oct. 10, 2002

(51) Int. Cl.[7] ............................................. B65H 5/02
(52) U.S. Cl. ........................................................ 271/273
(58) Field of Search ................................ 271/273, 274, 271/272

(56) References Cited

U.S. PATENT DOCUMENTS

| | | | | |
|---|---|---|---|---|
| 4,124,204 A | * | 11/1978 | VanBuskirk | |
| 4,583,726 A | * | 4/1986 | Nogi et al. | |
| 5,236,339 A | * | 8/1993 | Nishiumi et al. | |
| 5,265,869 A | * | 11/1993 | Morita | 271/274 |
| 5,431,389 A | * | 7/1995 | Wensink et al. | 271/273 |
| 5,443,255 A | * | 8/1995 | Nanba et al. | 271/273 |
| 5,547,179 A | * | 8/1996 | Wilcox et al. | 271/274 X |
| 5,765,825 A | * | 6/1998 | Watase | 271/273 X |
| 5,953,985 A | * | 9/1999 | Kobayashi | 271/273 X |
| 6,145,828 A | * | 11/2000 | Arai | 271/273 X |
| 6,332,611 B1 | * | 12/2001 | Tomita | 271/273 |

* cited by examiner

Primary Examiner—David H. Bollinger
(74) Attorney, Agent, or Firm—Lowe Hauptman Gilman & Berner, LLP

(57) ABSTRACT

An automatic document feeding apparatus for feeding a document to a flatbed scanner to conduct the scanning processes. The automatic document feeding apparatus includes an upper body, a lower body, a feeding path and at least a linkage set. The linkage set is able to uphold the upper body separated completely from the lower body. In this case, the spaces left between the upper body and the lower body is relatively wide for users to clear the jammed document. Further, the linkage set comprises plastic pad for providing stopping resistance to maintain said upper body at a certain distance above the lower body.

6 Claims, 8 Drawing Sheets

AUTOMATIC DOCUMENT FEEDING APPARATUS HAVING SEPARATION MECHANISM

BACKGROUND OF THE INVENTION

1. Field of the Invention

The present invention generally relates to an automatic document feeding apparatus, especially a feeding apparatus having an improved separation mechanism utilized in the feeding path.

2. Background Description

Scanner devices have been broadly employed to the image processing industry. The scanners can generally be categorized to two types, which are sheet-fed scanners and flatbed scanners. However, if there are many documents containing mass papers to be necessarily scanned, it would be difficult to employ a flatbed scanner to do the job. In this case, an automatic document feeder (ADF) is utilized in a flatbed scanner. The ADF is able to feed papers one by one to the flatbed scanner.

As shown in FIG. 1, an automatic document feeder 1 has an upper body 11 and a lower body 13. A feeding path 10 is located between the upper body 11 and the lower body 13. Main rollers 16, 20 and the auxiliary rollers 14, 18 further move a document along the feeding path 10. The feeding path 10 is formed by an inner shell 102 and an outer shell 104. The feeding path further contains a scanning area 12 which is an opening formed in the bottom of the outer shell 104. By the main rollers 16, 20 and the auxiliary rollers 14, 18, the document 34 is moved along the feeding path 10. The document is therefore inputted from the entrance 24 to the feeding path 10, and then be outputted to the exit 26. The automatic document feeder is positioned on the flatbed scanner 40. The scanning area 12 is located exactly on the image reading device of the flatbed scanner 40. When the document 34 is passed through the scanning area 12, the flatbed scanner will scan the document 34.

In the real using environment, the document 34 is occasionally jammed in the feeding path 10. In this case, the automatic document feeder is able to be separated to two parts such as an upper body and a lower body, along the separation axle 28, in order to clear the jammed document. However, referring to FIGS. 2 and 3, if the jammed area is near the entrance 12 or the scanning area 12, it would be easier to remove the jammed document since there are lots spaces to clear the document. But if the jammed area is near the exit 26 or the separation axle 28, it would be very difficult to remove the jammed document since the space left there is tight.

SUMMARY OF THE INVENTION

It is therefore an object of the present invention to provide an automatic document feeding apparatus for automatically feeding documents into the feeding path, which provides larger spaces for removing jammed documents in the feeding path.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
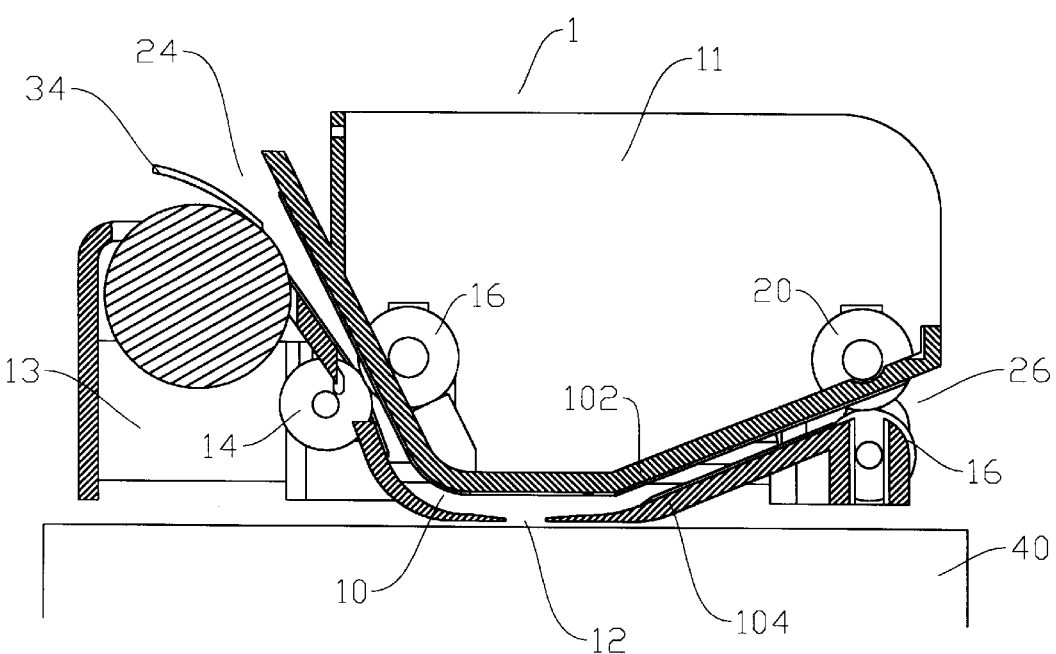
FIG. 1 shows the cross section of a prior used automatic document feeding apparatus.
Figure 2:
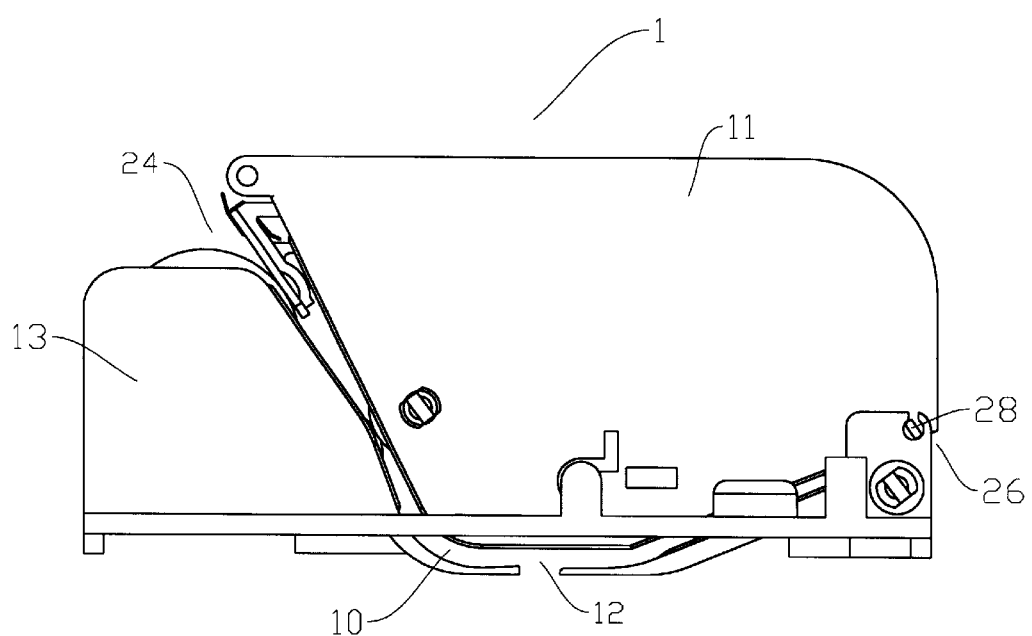
FIG. 2 is a side view of the prior used automatic document feeding apparatus.
Figure 3:
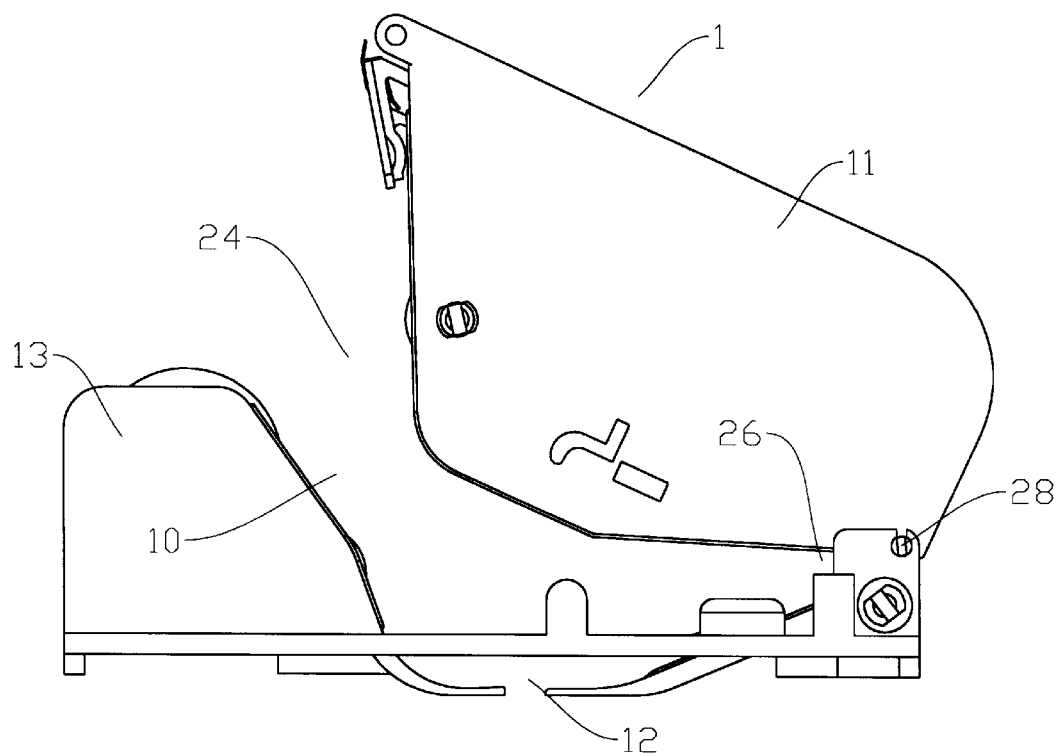
FIG. 3 shows the prior used automatic document feeding apparatus being positioned in an open situation for removing a jammed document.
Figure 4:
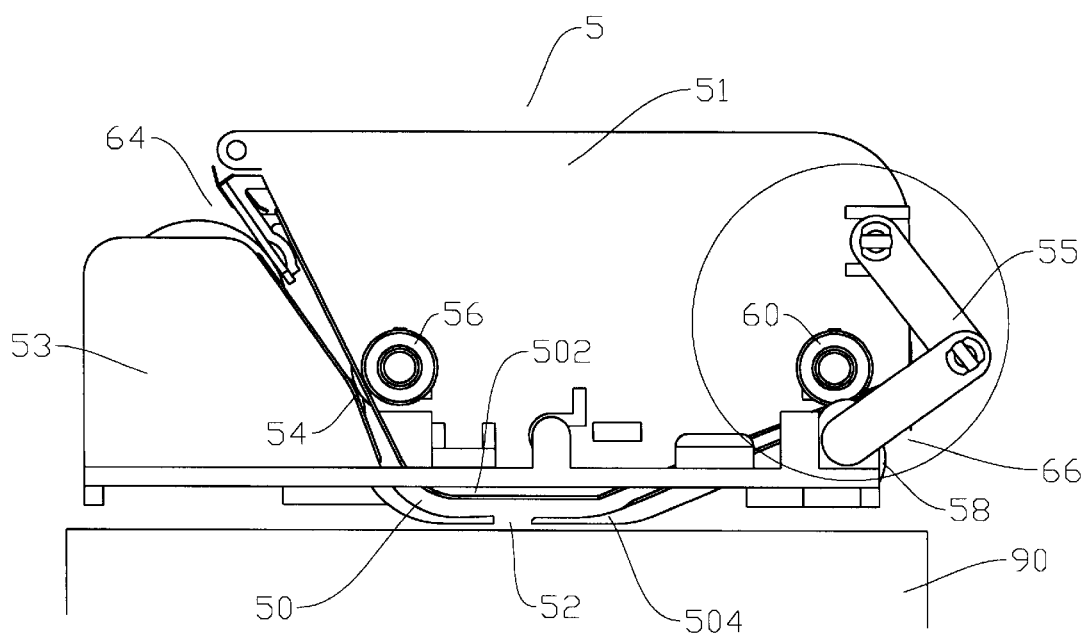
FIG. 4 is a schematic side view demonstration of a present invention.

Please refer to FIG. 4. FIG. 4 shows an automatic document feeding mechanism including an upper body 51, a lower body and a feeding path 50. A document (not shown in FIG. 4) is able to be moved by a main roller 56 and an auxiliary roller 54 from the entrance 64 into feeding path 50. Once the document passing the scanning area 52, the image reading device (not shown) of a scanner 90 would capture the image of the document. Further by another main roller 60 and another auxiliary roller 58, the document is moved to exit 66. In order to clear any jammed document during the scanning processes, the automatic document feeding apparatus further contains a linkage set 55. Generally, one rod of the linkage set 55 is pivoted on the upper body 51. Another rod of the linkage set 55 is pivoted onto the lower body 53. In this case, the upper body 51 and the lower body 53 is able to be separated completely as shown in FIG. 6.

Figure 5:
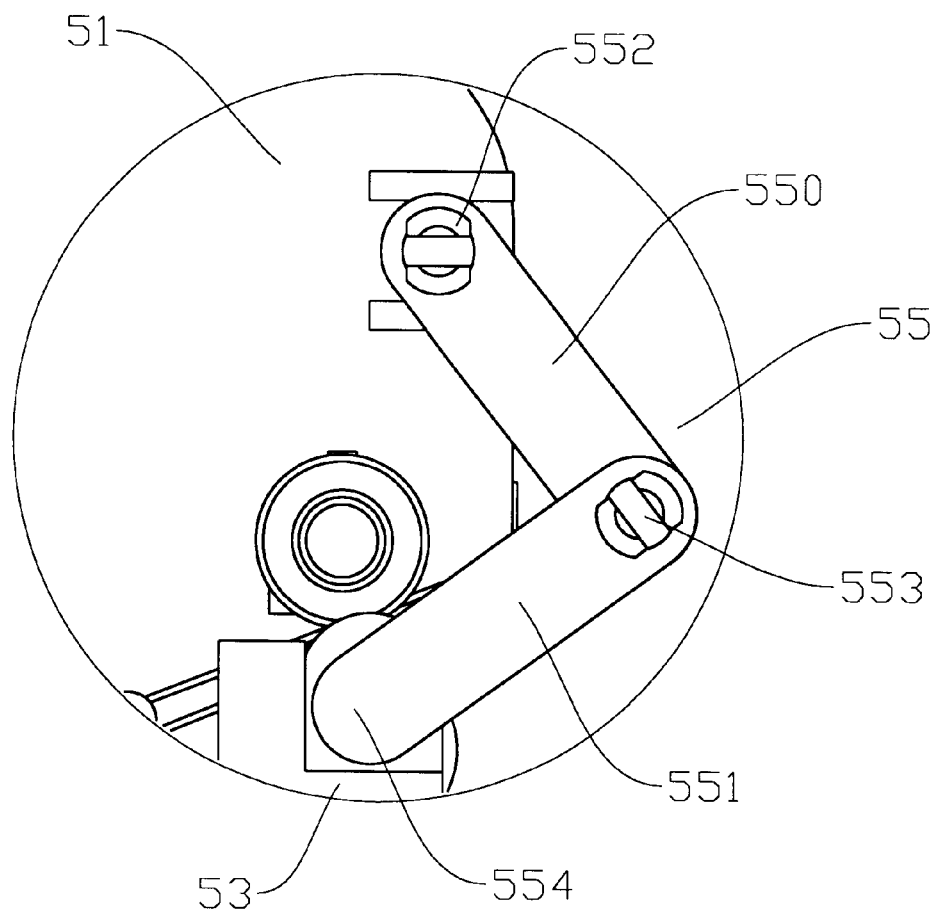
FIG. 5 shows the linkage set of the present invention.

FIG. 5 demonstrates the linkage set 55. As shown in the FIG. 5, the linkage set 55 has a first rod 550, a second rod 551, a first pivoting axle 552, a second pivoting axle 553 and a third pivoting axle 554. The first rod 550 and the second rod 551 are pivoted on the second pivoting axle 553. In this case, the first rod 550 and the second rod 551 is able to rotate freely along the second pivoting axle 553. Furthermore, the first rod 550 and the upper body 51 are pivoted on the first pivoting axle 552 in order to be able to freely rotate along the first pivoting axle 552. The second rod 551 and the lower body 53 are pivoted on the third pivoting axle 554 in order to be able to freely rotate along the first pivoting axle 554.

Figure 6:
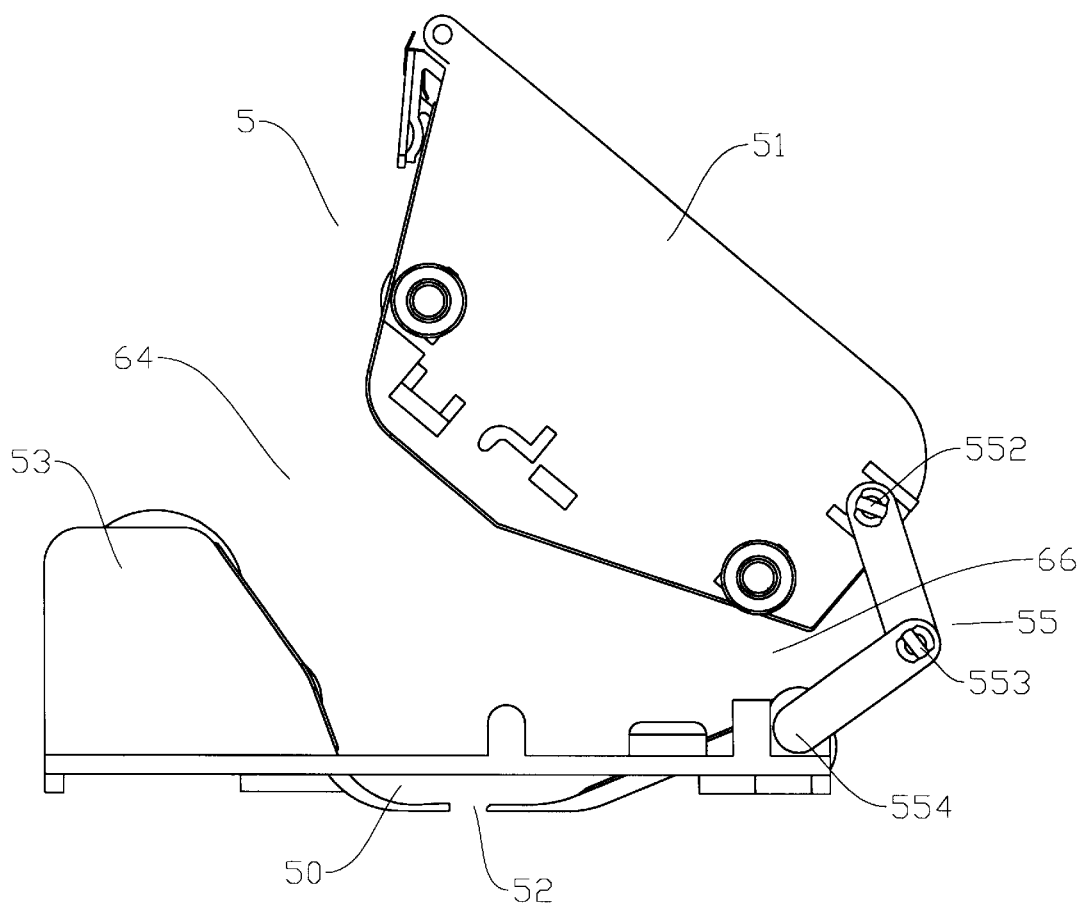
FIG. 6 shows the side view of the present invention after being separated for removing a jammed document.

Please refer the side view of the present invention shown in FIG. 6. Since the linkage set 55 is placed between the upper body 51 and the lower body 53, when there is occurring the document-jammed situation, the upper body 51 and the lower body 53 are able to be separated completely. In this case, the space for clearing the jammed document would be wider. In order to fix any position of the upper body 51 in a separating mode, the first pivoting axle 552, the second pivoting axle 553 and the third pivoting axle 554 may utilize plastic pads (not shown in figures) to provide resistance for stopping the falling gravity of the upheld upper body 51. In this regard, any kind of jammed situation, no matter near the entrance 64, scanning are 12 or the exit 66, users can easily remove and clear the jammed document if any.

Figure 7:
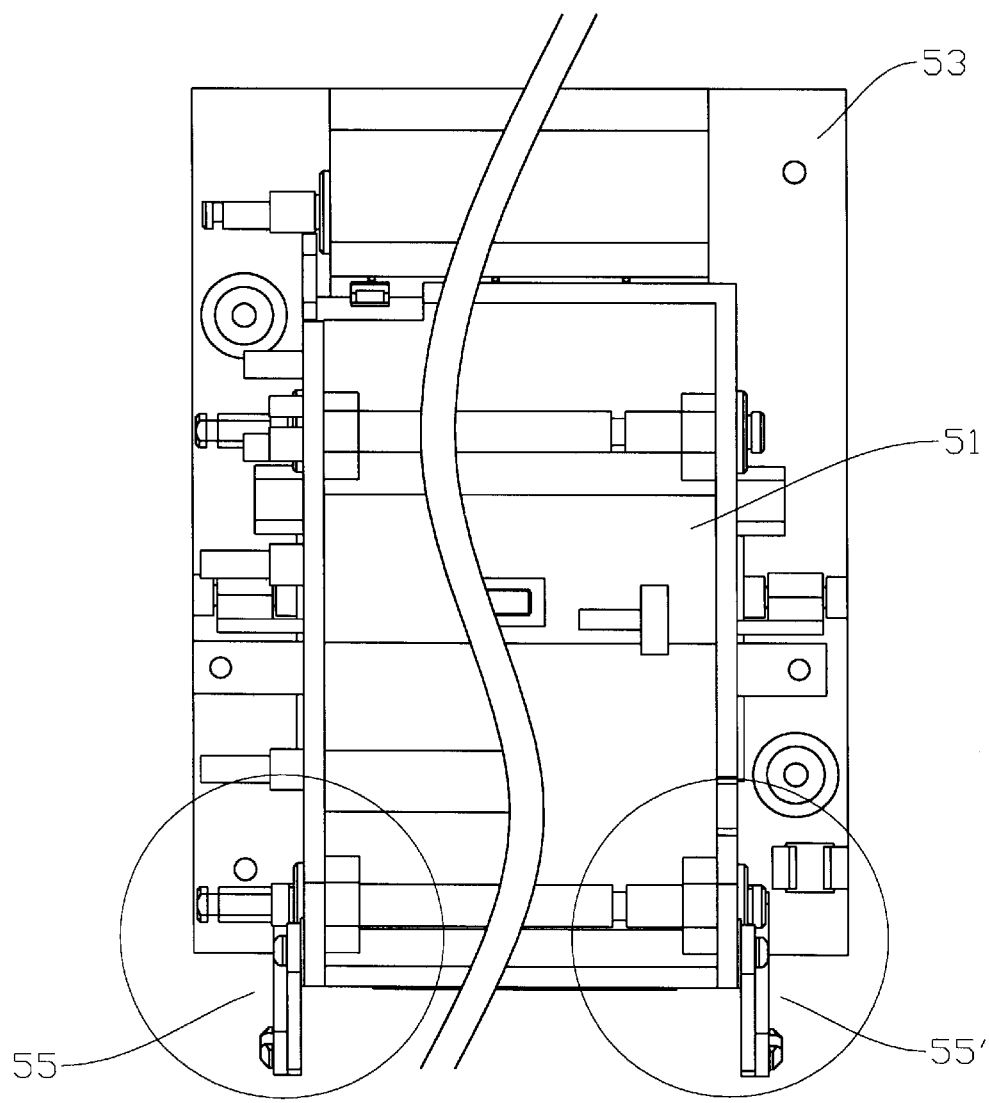
FIG. 7 shows the top view of the present invention.
Figure 8:
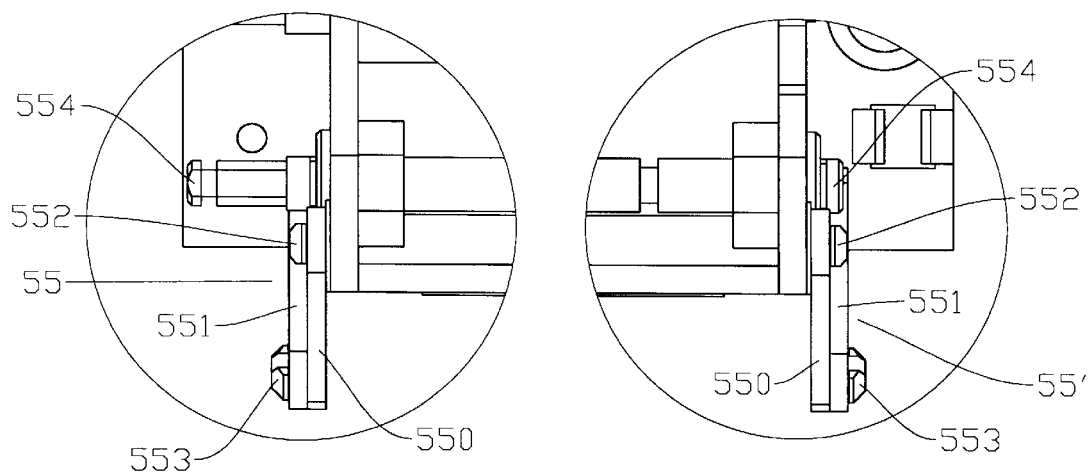
FIG. 8 is a detailed view of the linkage of the present invention.

Beside, in order to enhance the structure of the present invention for avoiding the linkage set broken down due to weak support when the upper body is completely separated from the lower body, two linkage sets 55, 55' are therefore employed as shown in FIG. 7. The linkage sets 55, 55' are positioned on both sides of the upper body 51. Further refer to FIG. 8. FIG. 8 is a detailed top view of the linkage sets. The first rod 550 and the second rod 551 are able to be received together in parallel. In this case, the first rod 550 and the second rod 551 can rotate along the second pivoting axle freely without interception to the rotation. For the same reason, another linkage set 55' also has the same structure and achieves the same effects. In this case, the upper body 51 is able to open smoothly and completely without causing any areas tight when clearing jammed paper in the feeding path.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An automatic document feeding apparatus, comprising:
   an upper body;
   a lower body;
   a conveying path, located between said upper body and said lower body for conveying a document to a scanning area for scanning;
   a linkage set, connecting to said upper body and said lower body, for allowing said upper body separated from said lower body in order to clear a jammed document, wherein said linkage set comprises:
   a first rod;
   a second rod;
   a first pivoting axle, pivoting said first rod and said upper body for allowing said first rod and said upper body rotating freely;
   a second pivoting axle, pivoting said first rod and said second rod for allowing said first rod and said second rod rotating freely; and
   a third pivoting axle, pivoting said second rod and said upper body for allowing said first rod and said lower body rotating freely.

2. The automatic document feeding apparatus of claim 1, further comprises a plastic paid positioned in said first pivoting axle for providing a stopping resistance.

3. The automatic document feeding apparatus of claim 1, further comprises a plastic pad positioned in said second first pivoting axle for providing a stopping resistance.

4. The automatic document feeding apparatus of claim 1, further comprises a plastic pad positioned in said third pivoting axle for providing a stopping resistance.

5. The automatic document feeding apparatus of claim 1, wherein said document is scanned by a scanner when said document is passing said scanning area.

6. The automatic document feeding apparatus of claim 5, wherein said scanner is a flatbed scanner.

* * * * *